United States Patent [19]

Maeda

[11] Patent Number: 5,233,641
[45] Date of Patent: Aug. 3, 1993

[54] RADIO TELEPHONE EQUIPMENT HAVING A SOUNDING DEVICE FOR GENERATING ALERT TONE INDICATIVE OF RESPONSE OF CALLED SUBSCRIBER

[75] Inventor: Koji Maeda, Tokyo, Japan
[73] Assignee: NEC Corporation, Tokyo, Japan
[21] Appl. No.: 850,254
[22] Filed: Mar. 11, 1992

Related U.S. Application Data

[63] Continuation of Ser. No. 490,243, Mar. 8, 1990, abandoned.

[30] Foreign Application Priority Data

Mar. 8, 1989 [JP] Japan ................................ 1-55666

[51] Int. Cl.5 .......................................... H04M 11/02
[52] U.S. Cl. .................................... 379/58; 379/164; 379/257; 379/372
[58] Field of Search .............. 379/58, 59, 61, 63, 379/157, 164, 201, 209, 372–375, 251, 257

[56] References Cited

U.S. PATENT DOCUMENTS

| | | | |
|---|---|---|---|
| 4,640,987 | 2/1987 | Tsukada et al. | 379/61 |
| 4,847,818 | 7/1989 | Olsen | 379/58 |
| 4,884,294 | 11/1989 | Inagami | 379/61 |
| 4,893,335 | 1/1990 | Fuller et al. | 379/201 |

FOREIGN PATENT DOCUMENTS 0046366 2/1989 Japan .................................. 379/209

OTHER PUBLICATIONS

AT&T Bell Labs publication Record article: "LASS: Putting the telephone customer in charge", Hirschman et al., May 1985, pp. 11–16.

*Primary Examiner*—Curtis Kuntz
*Assistant Examiner*—Dwayne D. Bost
*Attorney, Agent, or Firm*—Sughrue, Mion, Zinn, Macpeak & Seas

[57] ABSTRACT

Radio telephone equipment having a sounding device, a sounding device drive circuit for driving the sounding device, and a control circuit for controlling the sounding device drive circuit. When a person manipulates the equipment to originate a call, the equipment interchanges various control signals with a base station to set up a channel for communication. Then, the base station sends to the equipment a control signal indicative of the fact that the other party has responded to the call. In response, the equipment causes the control circuit to activate the sounding device drive circuit which in turn generates a predetermined alert tone to show the user that a conversation is allowed to be held.

9 Claims, 4 Drawing Sheets

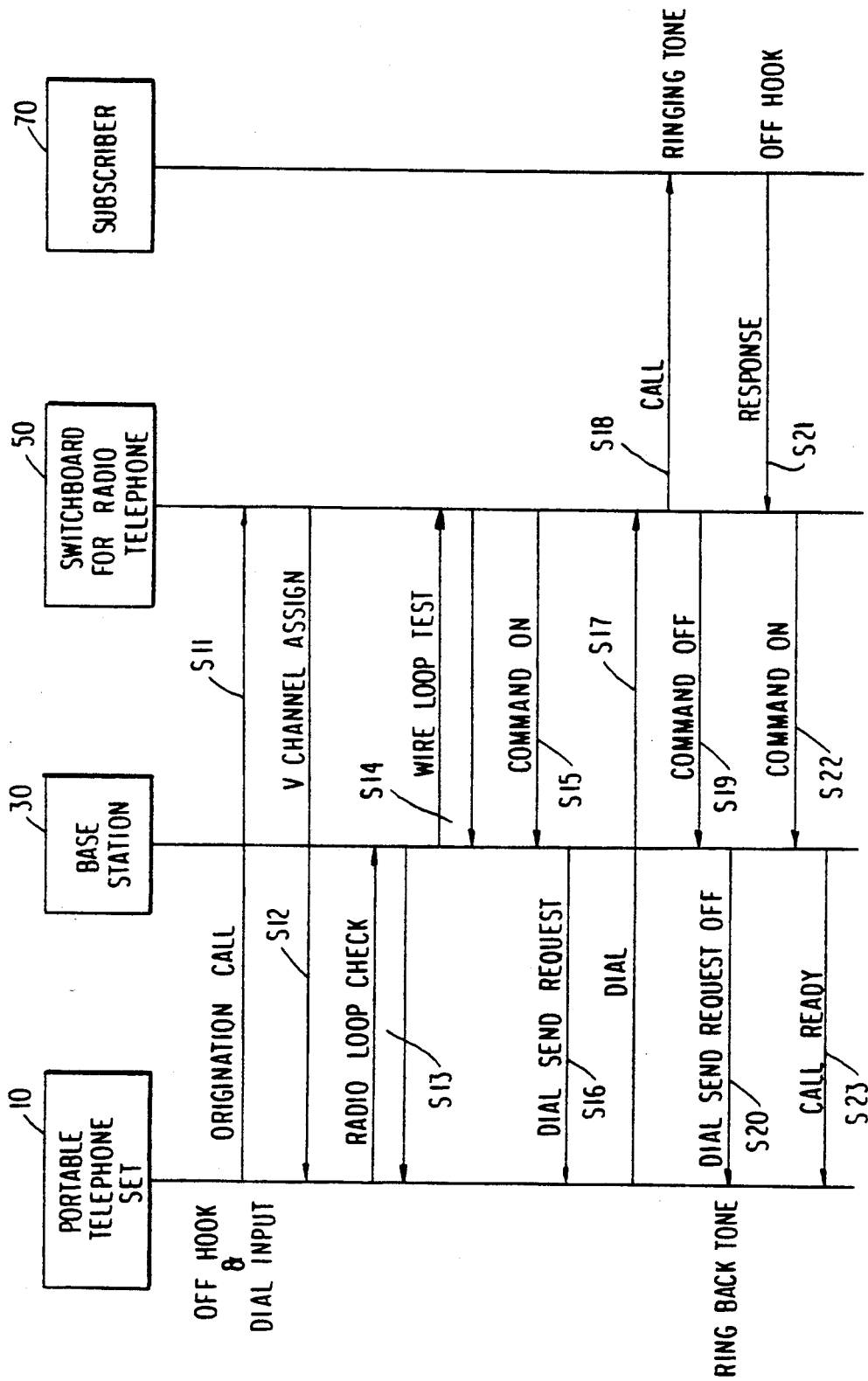

RADIO TELEPHONE EQUIPMENT HAVING A SOUNDING DEVICE FOR GENERATING ALERT TONE INDICATIVE OF RESPONSE OF CALLED SUBSCRIBER

This is a continuation of application Ser. No. 07/490,243 filed Mar. 8, 1990, abandoned.

BACKGROUND OF THE INVENTION

The present invention relates to radio telephone equipment and, more particularly, to radio telephone equipment of the type communicating with other parties under the control of a base station.

In a vehicle telephone system, portable telephone system or similar radio telephone system, radio telephone equipment such as a vehicle telephone terminal or a portable telephone set interchanges various kinds of control signals with a base station over a radio channel. The radio telephone system, therefore, needs an interval as long as several seconds to several tens of seconds between the time when the user manipulates keys of the telephone equipment for originating a call and the time when the user is actually allowed to begin a conversation with the other subscriber or party.

During this time interval, the user who operated the equipment for call origination can see that the call has been connected to the other party, by monitoring sound emitted by a loudspeaker which is installed in the equipment in addition to a microphone and a receiver for conversation. Then, the user picks up the handset or the portable telephone set to begin a conversation with the other party. Such a monitoring function is generally referred to as a loudspeaker receiving function.

The loudspeaker receiving function stated above makes it unnecessary for the user who originated a call to continuously hold the handset or the portable telephone until the user recognizes the voice of the other party which will be produced from the loudspeaker. However, if the volume of the sound monitored through the loudspeaker is small or the quality of the sound is poor, it is likely that engine noise and ambient noise coming into the vehicle cabin will prevent the user from timely recognizing that the other party has responded to the call. It has been customary, therefore, to use a loudspeaker which is about 50 millimeters in diameter and about 20 millimeters in thickness. A loudspeaker having such large dimensions is not feasible for portable telephone equipment whose space is at a decided premium.

SUMMARY OF THE INVENTION

It is therefore an object of the present invention to provide radio telephone equipment which surely informs the user who originated a call of the fact that the other party has responded to the call and is ready to hold a conversation and, yet, has a configuration which is feasible for miniaturization.

Radio telephone equipment of the present invention has a sounding device, a sounding device drive circuit for driving the sounding device, and a control circuit for controlling the sounding device drive circuit. The control circuit activates the sounding device drive circuit on receiving from a base station a signal which indicates that the other party has responded to a call. When activated, the sounding device drive circuit drives the sounding device to generate a predetermined alert tone.

The alert tone informs the person who originated the call of the fact that the other party has responded to the call. The alert tone which is easy to recognize can be implemented by a miniature sounding device and, therefore, implements miniature and light weight radio telephone equipment.

Preferably, the radio telephone equipment of the present invention further has means for deactivating the sounding device drive circuit. This means may be operated by the user to stop the alert tone. Then, the user is allowed to hold a conversation with the other party.

Advantageously, the sounding device of the radio telephone equipment of the present invention generates the alert tone by using a piezoelectric material.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 5 is a flow diagram representative of details of control which is executed in call origination processing of FIG. 4 in a radio telephone system implemented by the embodiment of FIG. 1.

DETAILED DESCRIPTION OF THE PREFERRED EMBODIMENT

Figure 1:
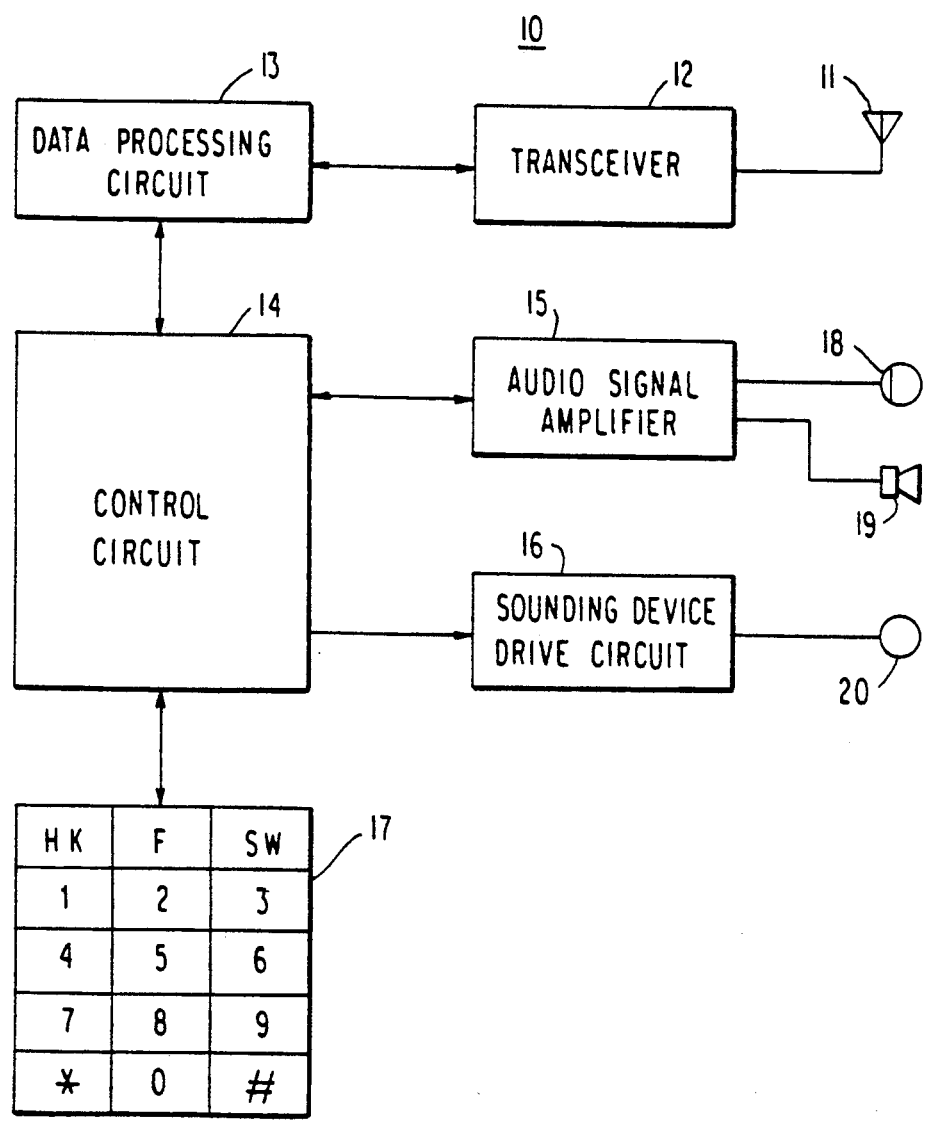
FIG. 1 is a schematic block diagram showing a preferred embodiment of the radio telephone equipment in accordance with the present invention.

Referring to FIG. 1 of the drawings, a portable telephone set embodying the present invention is shown and generally designated by the reference numeral 10. As shown, the telephone set 10 has an antenna 11, a transceiver 12, a data processing circuit 13 for transmitting and receiving various kinds of data from a base station (not shown) via the antenna 11 and transceiver 12, a control circuit 14 for supervising the operations of the entire telephone set 10, a telephone microphone 18 and a receiver 19 for telephone conversation, an audio signal amplifier 15, a sounding device or alarm horn 20 implemented by a piezoelectric ceramic element, a sounding device drive circuit 16 for driving the horn 20 to generate a predetermined alert tone, and a keyboard 17 having numeral keys and function keys. The control circuit 14 is implemented as a CPU (Central Processing Unit). The audio signal amplifier 15 amplifies an audio signal from the microphone 18 and feeds the resultant signal to the transceiver 12 via the control circuit 14 and data processing circuit 13. An audio signal from the other party coming in through the antennal 11 and transceiver 12 is fed to the audio signal amplifier 15 via the data processing circuit 13 and control circuit 14. Then, the audio signal amplifier 15 amplifies the incoming audio signal and delivers the amplified signal to the receiver 19.

Figure 2:
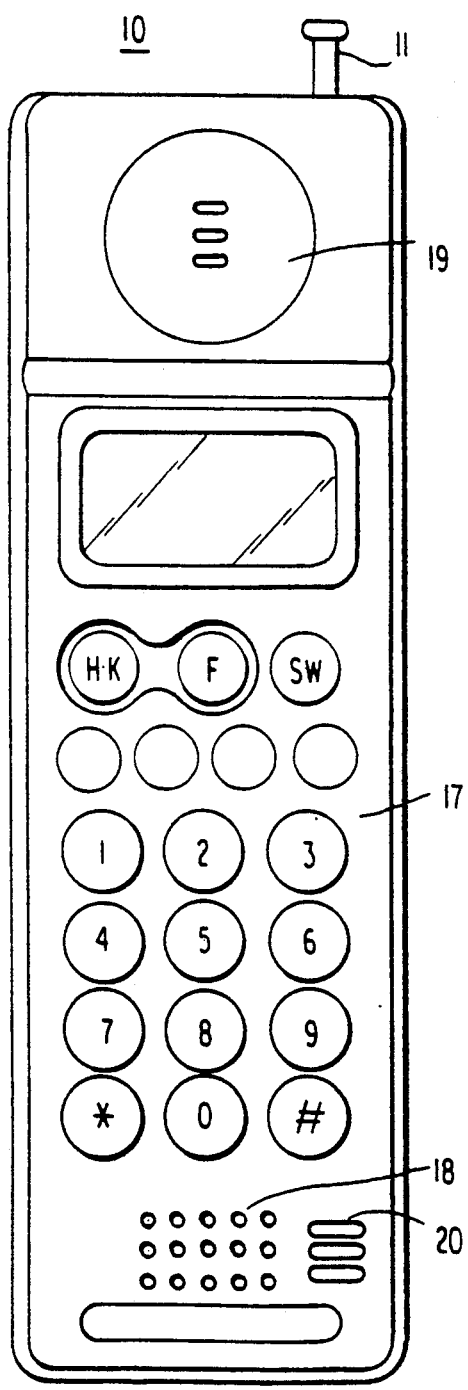
FIG. 2 is a front view of the equipment shown in FIG. 1.
Figure 3A:
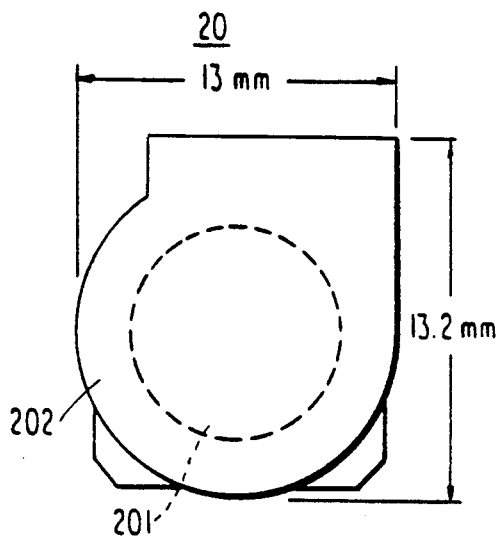
FIG. 3a is a front view of an alarm horn also shown in FIG. 1.
Figure 3B:
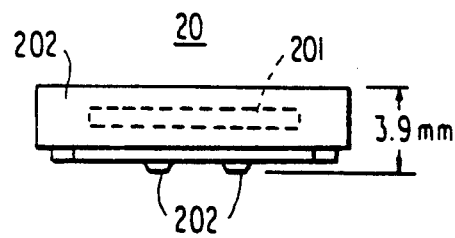
FIG. 3b is a side view of the alarm horn.

As shown in FIG. 2, the telephone set 10 has a handset type configuration and is accommodated in a casing made of plastic. The horn 20 is located in a front lower portion of the telephone set 10 and beside the telephone microphone 18. As FIGS. 3a and 3b indicate, the horn 20 has a casing 202 and a piezoelectric ceramic element 201 which is received in the casing 202. The alarm horn 20 is known in the art and thus its detailed description should not be necessary. Serving as a sounding device, the piezoelectric ceramic element 201 is made of piezoelectric ceramic and loaded with electrodes at opposite sides thereof. The electrodes are each implemented as a thin metallic film and connected to respective one of terminals 202. The piezoelectric ceramic element 201 transforms AC electric energy applied to the terminals 202 to acoustic energy. Since the function assigned to the alarm horn 20 is simply to generate a tone which is easy to notice even in noisy environments, it is not necessary that the electroacoustic conversion efficiency of the alarm horn 20 be flat over a wide range. In the illustrative embodiment, the alarm horn 20 is designed such that the electroacoustic conversion efficiency has a peak at the frequency of about 2.5 kilohertz. More specifically, the alarm horn 20 is capable of generating a tone of about 2.5 kilohertz at a level high enough for a person to discriminate it from noise in a vehicle cabin, despite that it is miniature as shown in FIGS. 3a and 3b. Having such a miniature configuration, the alarm horn 20 can be received in a small space beside the telephone microphone 18 (see FIG. 2). The alarm horn 20 is located beside the telephone microphone 18, i.e., in the front lower portion of the telephone set 10 as shown and described, in order that the source of great volume may be spaced away from the user's ears as far as possible when the user uses the telephone set 10.

Figure 4:
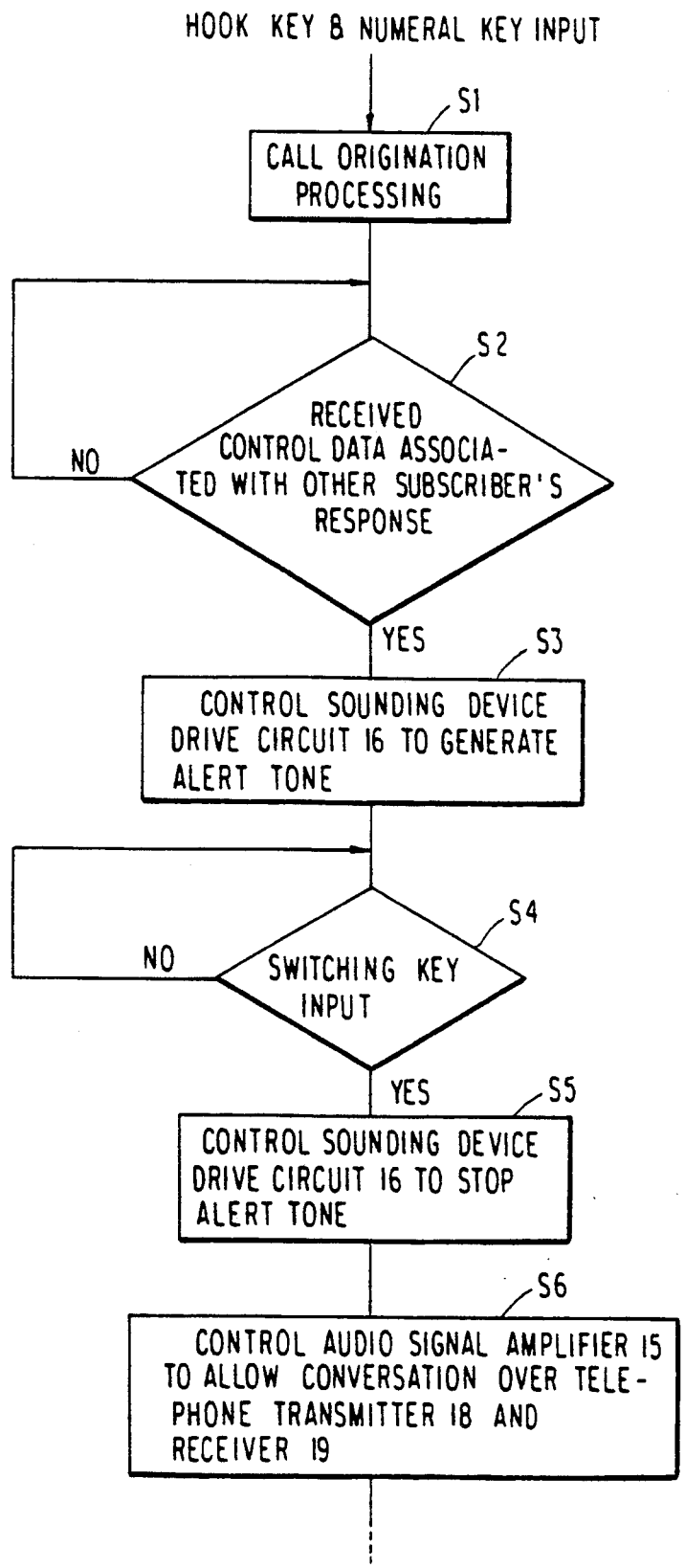
FIG. 4 is a flowchart demonstrating a control procedure which a control circuit shown in FIG. 1 executes at the time of call origination.

A reference will be made to FIGS. 4 and 5 for describing a procedure for originating a call on the telephone set 10. The user intending to originate a call presses a hook key HK on the keyboard 17 and then presses the numeral keys to enter a telephone number assigned to the destination. Then, as shown in FIG. 5, the control circuit 14 executes call origination processing and interchanges various kinds of data with a base station 30, a switchboard for radio telephone 50, and a subscriber 70 at the destination via the data processing circuit 13 and transceiver 12 (S1, FIG. 4).

The origination processing S1 will be described more specifically with reference to FIG. 5. In the figure, the control circuit 14 generates an origination call signal and tunes the transceiver 12 to a control channel with respect to radio frequency. The origination call signal is transmitted to the base station 30 via the data processing circuit 13 and transceiver 12. In response, the base station 30 transfers the origination call signal to the switchboard 50 (S11). On receiving the origination call signal, the switchboard 50 assigns one of radio frequencies available for a call, i.e., one V (voice) channel to the portable telephone set 10 via base station 30 (S12). Then, the control circuit 14 tunes the transceiver 12 to the designated V channel and executes a radio loop check with the base station 30 (S13). In addition, the base station 30 executes a wire loop check with the switchboard 50 (S14).

When the radio loop check and wire loop check are completed, the switchboard 50 sends a CD ON (Command ON) command to the base station 30 (S15). In response to the CD ON command, the base station 30 transmits a dial send request to the portable telephone set 10 (S16). On receiving the dial send request, the control circuit 14 sends a dial signal to the switchboard 50 (S17). Then, the switchboard 50 calls the subscriber 70 corresponding to the received dial signal (step S18) while sending a CD OFF (Command OFF) command to the base station (step S19). In response to the CD OFF command, the base station 30 stops sending the dial send request to the telephone set 10 (S20). As a result, the telephone set 10 generates a ring back tone while the subscriber station 70 generates a ringing tone. When a person at the subscriber station 70 off-hooks, the off-hook is reported to the switchboard 50 as a response (S12). On receiving this report, the switchboard 50 again sends a CD ON command to the base station 30 (S22). In response to this CD ON command, the base station 30 sends to the telephone set 10 a control signal representative of a call ready state, i.e. control data associated with the response of the other party (S23). Regarding a public radio telephone system, billing or charging begins on the basis of a response of the other party and, therefore, control signals relating to a charge will be interchanged. The procedure shown in FIG. 5 assumes a private radio telephone system and, therefore, does not involve any control signal relating to a charge.

By the call originating processing described above, the call originating on the portable telephone set 10 is connected to the subscriber 70, and control data associated with the other subscriber's response is received by the data processing circuit 13 and fed to the control circuit 14. Then, the control circuit 14 detects the control data (S2) and controls the sounding device drive circuit 16 to cause the horn 20 to generate an alart tone which is a continuous tone of about 2.5 kilohertz (S3). Alerted by the tone, the user of the telephone set 10 recognizes that the other party has responded to the call and, so, presses a switching key SW provided on the keyboard 17. on detecting the operation of the key SW (S4), the control circuit 14 controls the sounding device drive circuit 16 to cause the horn 20 to stop generating the alert tone (S5). After the step S5, the control circuit 14 controls the audio signal amplifier 15 to enable a conversation over the telephone microphone 18 and telephone receiver 19 (S6).

In summary, in accordance with the present invention, radio telephone equipment informs a user of a response of the other party by an alert tone when a call is originated thereon. This, coupled with the fact that the alert tone is generated on reception of a control signal from a base station representative of the response, allows the user to recognize the time when the telephone equipment is ready surely and accurately.

A sounding device for generating the alert tone has only to generate a tone of a single frequency. Hence, a clear alert tone is achievable with a sounding device which is far smaller in size than a loudspeaker heretofore used with radio telephone equipment for monitoring the voice of the other party, further enhancing the miniaturization of radio telephone equipment.

Sine the alert tone is easier to notice than voice in noisy environments, its duration does not have to be long. This is successful in reducing noise which will propagate to the circumference, compared to the prior art which requires a user to monitor a response of the other party.

Further, with the prior art which does not generate an alert tone and outputs only the voice of the other party being monitored, a user cannot see whether or not the other party has responded if the latter is silent. In contrast, the present invention allows a user to surely recognize the response even when the other party is silent.

The present invention is applicable not only to portable telephone equipment but also to all the kinds of radio telephone equipment which are controlled by a base station for call connection and need be miniature and light weight, e.g. vehicle telephone terminals.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. Radio telephone equipment comprising:
   means for manually generating a dial signal;
   a sounding device;
   a sounding device drive circuit for causing said sounding device to generate a predetermined alert tone; and
   control means for activating said sounding device drive circuit in response to a control signal indicative that a base station has produced a call signal in response to said dial signal, and activating said sounding device drive circuit in response to a call ready signal issued by said base station which is responsive to the called subscriber station going off-hook while the subscriber remains off-hook, and producing a response signal in response to said call signal.

2. A system as claimed in claim 1, wherein said radio telephone equipment further comprises alert tone stopping means for stopping an operation of said sounding device drive circuit which is driving said sounding device.

3. A system as claimed in claim 2, wherein a conversation is allowed to be held after said alert tone stopping means has stopped the operation of said sounding device drive circuit.

4. A system as claimed in claim 1, wherein said sounding device comprises a piezoelectric material.

5. Radio telephone equipment comprising:
   a transmit and receive antenna;
   a transceiver connected to said transmit and receive antenna;
   data processing means for transmitting and receiving data from a base station via said transmit and receive antenna and said transceiver;
   a telephone microphone;
   a telephone receiver;
   audio signal amplifying means for feeding audio information coming in through said telephone microphone to said transceiver via said data processing means and feeding audio information from another party coming in through said transceiver to said telephone receiver via said data processing means;
   means for manually generating a dial signal;
   sounding device means for generating a predetermined alert tone; and
   control means for controlling said sounding device means to generate the alert tone in response to a control signal indicative that a base station has produced a call signal in response to said dial signal, and activating said sounding device drive circuit in response to a call ready signal issued by said base station which is responsive to the called subscriber station going off-hook while the subscriber remains off-hook, and producing a response signal in response to said call signal.

6. A system as claimed in claim 5, wherein said radio telephone equipment is bodily received in a handset type casing.

7. A system as claimed in claim 6, wherein said sounding device means is positioned beside said telephone microphone.

8. A system as claimed in claim 5, wherein an electro-acoustic conversion efficiency of said sounding device means has a peak at a predetermined frequency.

9. Radio telephone equipment comprising:
   means for manually generating a dial signal;
   sound device means for generating a predetermined alert tone; and
   means for controlling said sound device means to generate said predetermined alert tone in response to a control signal indicative that a base station has produced a call signal in response to said dial signal, and activating said sounding device drive circuit in response to a call ready signal issued by said base station which is responsive to the call subscriber station going off-hook while the subscriber remains off-hook, and producing a response signal in response to said call signal.

* * * * *

UNITED STATES PATENT AND TRADEMARK OFFICE
CERTIFICATE OF CORRECTION

PATENT NO. : 5,233,641

DATED : August 3, 1993

INVENTOR(S) : Koji MAEDA

It is certified that error appears in the above-identified patent and that said Letters Patent is hereby corrected as shown below:

Col. 3, line 44, before "origination" insert --call--;

Col. 4, line 30, delete "alart" and insert --alert--;

line 57, delete "sine" and insert --since--.

Signed and Sealed this

Fifth Day of April, 1994

Attest:

Attesting Officer

BRUCE LEHMAN

Commissioner of Patents and Trademarks